US011048677B1

(12) United States Patent
Chandrashekar et al.

(10) Patent No.: US 11,048,677 B1
(45) Date of Patent: Jun. 29, 2021

(54) STREAMLINED TRANSACTION AND DIMENSION DATA COLLECTION

(71) Applicant: ServiceNow, Inc., Santa Clara, CA (US)

(72) Inventors: Sridhar Chandrashekar, Sammamish, WA (US); Stephen Scott Tucker, Kirkland, WA (US); Kelly Patricia Vincent, Renton, WA (US); Christopher Robert Mutzel, Seattle, WA (US); Chinna Babu Polinati, Snoqualmie, WA (US); Kanwaldeep Kaur Dang, Sammamish, WA (US); Greeshma Kulamarva Balasubrahmanya, Redmond, WA (US); Eugen Ardeleanu, Bellevue, WA (US); Kiran Kumar Bushireddy, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 473 days.

(21) Appl. No.: 14/503,505

(22) Filed: Oct. 1, 2014

(51) Int. Cl.
*G06F 16/22* (2019.01)
*H04L 29/08* (2006.01)
*H04L 12/26* (2006.01)

(52) U.S. Cl.
CPC .............. *G06F 16/22* (2019.01); *H04L 43/04* (2013.01); *H04L 67/1097* (2013.01)

(58) Field of Classification Search
CPC .... G06F 17/30312; G06F 17/30; G06F 11/30; H04L 43/04; H04L 67/1097

USPC ........................................................ 707/736
See application file for complete search history.

(56) References Cited

U.S. PATENT DOCUMENTS

| 6,035,306 | A | 3/2000 | Lowenthal et al. |
| 6,615,222 | B2 | 9/2003 | Hornibrook et al. |
| 6,804,627 | B1 * | 10/2004 | Marokhovsky ..... G06F 11/3409 702/182 |
| 6,898,556 | B2 | 5/2005 | Smocha et al. |
| 6,910,036 | B1 | 6/2005 | Shee |
| 6,944,630 | B2 | 9/2005 | Vos et al. |
| 7,328,209 | B2 | 2/2008 | Das et al. |
| 7,349,919 | B2 | 3/2008 | Russell et al. |
| 7,512,626 | B2 | 3/2009 | Chitgupakar et al. |
| 7,542,998 | B1 | 6/2009 | Lavie et al. |

(Continued)

*Primary Examiner* — Hosain T Alam
*Assistant Examiner* — Tracy M McGhee
(74) *Attorney, Agent, or Firm* — Fletcher Yoder PC

(57) ABSTRACT

Disclosed are methods, apparatuses and systems for collecting transactional and dimensional data. One implementation includes a configuration management database, a first data collection agent operating on a first monitored server to collect metadata associated with the first monitored server from the configuration management database using the first data collection agent, collect metric data from the first monitored server regarding operation of the first monitored server, wherein the metric data includes at least one metric collected from at least one application executing on the first monitored server; and assemble the collected metric data and at least part of the collected metadata into a packet for transmission from the first monitored server to a message bus; and a distributed database configured to receive the packet from the message bus and to store the collected metric data and metadata included in the packet.

20 Claims, 7 Drawing Sheets

(56) References Cited

U.S. PATENT DOCUMENTS

| | | | |
|---|---|---|---|
| 7,627,620 B2 | 12/2009 | Campos et al. | |
| 7,673,291 B2 | 3/2010 | Dias et al. | |
| 7,734,645 B2 | 6/2010 | Russell et al. | |
| 7,756,840 B2 | 7/2010 | Warshawsky | |
| 7,809,690 B2 | 10/2010 | Pommerenk et al. | |
| 8,239,369 B2 | 8/2012 | Levin | |
| 8,250,009 B1 | 8/2012 | Breckenridge et al. | |
| 8,311,967 B1 | 11/2012 | Lin et al. | |
| 8,364,613 B1 | 1/2013 | Lin et al. | |
| 8,370,280 B1 | 2/2013 | Lin et al. | |
| 8,401,991 B2 | 3/2013 | Wu et al. | |
| 8,626,791 B1 | 1/2014 | Lin et al. | |
| 8,700,602 B2 | 4/2014 | Schapker et al. | |
| 2002/0198985 A1* | 12/2002 | Fraenkel | H04L 41/5009 709/224 |
| 2004/0172408 A1 | 9/2004 | Klosterhalfen et al. | |
| 2005/0278342 A1* | 12/2005 | Abdo | G06F 9/4843 |
| 2007/0083500 A1 | 4/2007 | Zibitsker | |
| 2009/0164443 A1 | 6/2009 | Ramos et al. | |
| 2009/0240711 A1* | 9/2009 | Levin | G06F 16/217 |
| 2011/0035366 A1* | 2/2011 | Warshawsky | G06F 16/2358 707/705 |
| 2013/0117208 A1 | 5/2013 | Dousse et al. | |
| 2013/0318031 A1 | 11/2013 | Bawa et al. | |

\* cited by examiner

400

```
Sample Packet sent to Aggregation service
{
  "timestamp": 12345,
  "version": 1,
  "metadata": {                                         402
    "deploymentModel": "1",
    "sysId": "1",
    "name": "app123",
    "sku": "1.A",
    "operationalStatus": "OPERATIONAL",
    "datacenterName": "data1"
  },
  "metrics": {
    "cpu_idle": 21,
    "cpu_iowait": 0.0,                                  404
    "mem_free": 5547648
  },
  "appInstances": [{                                    406
    "appNodes": [{
      "metadata": {
        "nodeId": "a73b036b6d9670d5622750ac8fa81f4e",   408
        "primary": true,
        "nodeType": "GENERIC",
        "schedulerState": "ANY"
      },
      "metrics": {                                      410
        "servlet_metrics_sql_inserts_fifteen_count": 685,
        "servlet_metrics_session_waiters_fifteen_max": 4,
        "db_pools_pool_available": 30,
        "servlet_metrics_sql_response_fifteen_max": 22
      }
    }],
    "metadata": {
      "warVersion": "sample.war",
      "instanceId": "0f4316d3ffd624c06663762fa87efef3",
      "customer": "Foo Bar",                            412
      "instancePurpose": "PRODUCTION"
    }
  }]
}
```

FIG. 4

STREAMLINED TRANSACTION AND DIMENSION DATA COLLECTION

TECHNICAL FIELD

This disclosure relates to data warehouse database systems.

BACKGROUND

Modern computing systems can be large systems including multiple servers or processors communicating over local- or wide-area networks serving multiple clients. These systems can store very large amounts of data and process many transactions in a given time period. Maintaining optimal system performance and the collection and analysis of transactional and dimensional data can be difficult or suboptimal in current systems.

SUMMARY

Disclosed herein are aspects of systems, methods and apparatuses for transaction and dimensional data collection.

In an implementation a system is provided including one or more processors and one or more memories including instructions executable by the one or more processors to execute a configuration management database including a plurality of configuration items each having a plurality of attributes, a first data collection agent operating on a first monitored server to collect metadata associated with the first monitored server from the configuration management database, collect metric data from the first monitored server regarding operation of the first monitored server, wherein the metric data includes at least one metric collected from at least one application executing on the first monitored server, and assemble the collected metric data and at least part of the collected metadata into a packet for transmission from the first monitored server to a message bus, and a distributed database configured to receive the packet from the message bus and to store the collected metric data and metadata included in the packet.

In an implementation, a method is provided including providing a configuration management database on a first management server, the configuration management database including a plurality of configuration items each having a plurality of attributes, providing a first data collection agent on a first monitored server, the first data collection agent configured to collect metadata associated with the first monitored server from the configuration management database, collect metric data from the first monitored server regarding operation of the first monitored server, wherein the metric data includes at least one metric collected from at least one application executing on the first monitored server, and assemble the collected metric data and at least part of the collected metadata into a packet for transmission from the first monitored server to a message bus, wherein the transmission from the first monitored server to the message bus is performed using a single pipeline, and providing a distributed database on a second management server configured to receive the packet from the message bus and to store the collected metric data and metadata included in the packet, and generating an indication of a system performance of the first monitored server by applying a machine learning model to the metadata and metric data collected and transmitted by the first data collection agent, the machine learning model including a comparison between a subset of the collected metric data and a statistical measure of the collected metric data.

In an implementation, a system is provided including a configuration management database configured to execute on a first management server having a processor and memory, the configuration management database including a plurality of configuration items each having a plurality of attributes, means for collecting metadata associated with the first monitored server from the configuration management database using a first data collection agent, means for collecting metric data from the first monitored server regarding operation of the first monitored server, wherein the metric data includes at least one metric collected from at least one application executing on the first monitored server, means for assembling the collected metric data and at least part of the collected metadata into a packet for transmission from the first monitored server to a message bus, and a distributed database configured to execute on a second management server having a processor and memory, the distributed database operable to receive the packet from the message bus and to store the collected metric data and metadata included in the packet.

These and other implementations will be described in additional detail hereafter.

BRIEF DESCRIPTION OF THE DRAWINGS

The description herein makes reference to the accompanying drawings wherein like reference numerals refer to like parts throughout the several views, and wherein:

FIG. 4 is a diagram of sample data messages according to a disclosed implementation;

DETAILED DESCRIPTION

Figure 1:
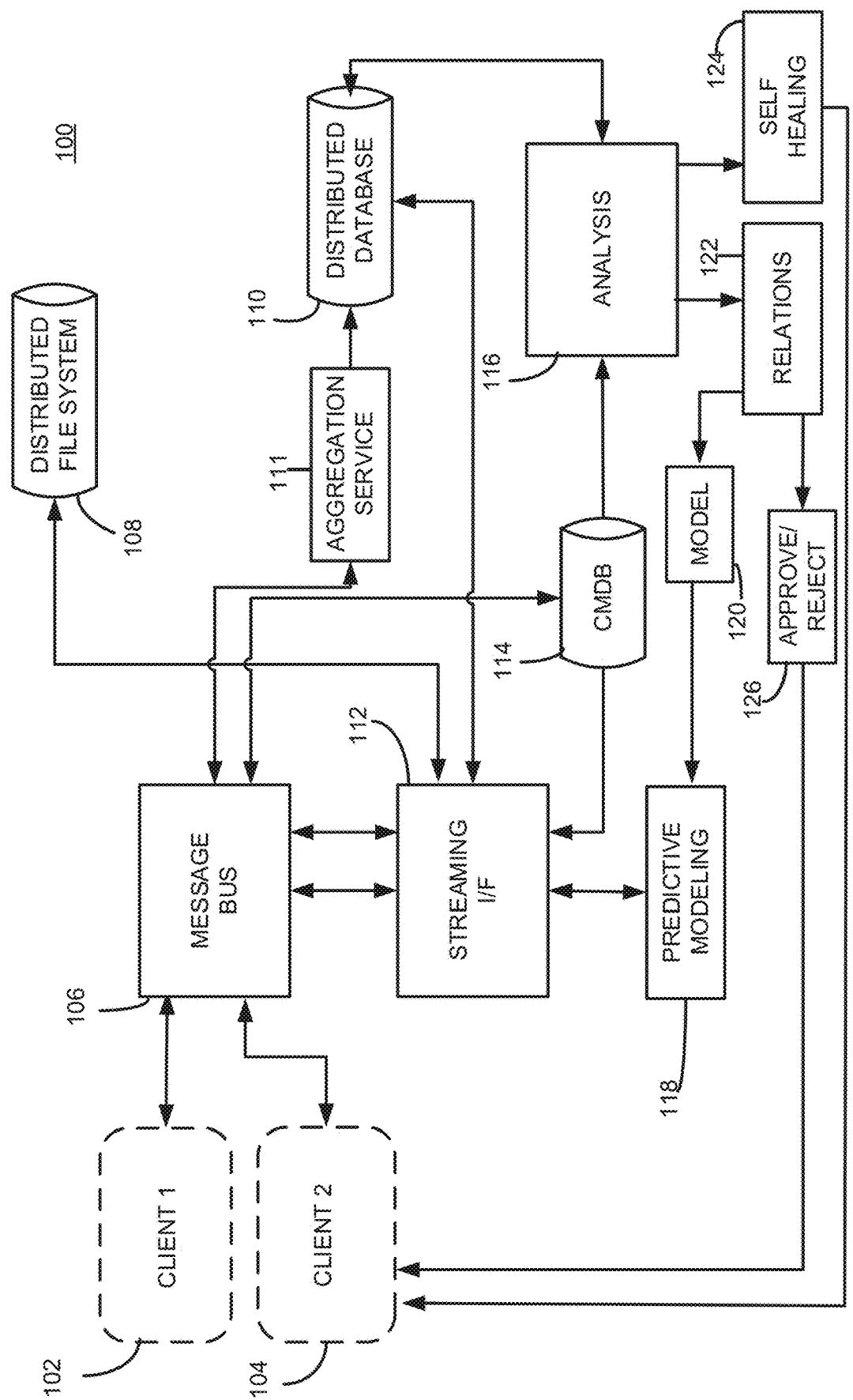
FIG. 1 is a diagram of a service intelligence system according to a disclosed implementation.

Data warehouses can include dimensional and transactional (e.g., fact) data. Typically, a data warehouse collects data using disparate sources and multiple pipelines for collecting data. The use of disparate sources and multiple pipelines can result in the use of out-of-date data (e.g., data from one source may be more current than data from another source) or the inability to obtain near real-time or point-in-time information regarding a dimension when a particular event occurs. Furthermore, in data warehouses, such as in Big Data or NoSQL data warehouses, the joining of data between multiple data sources can be expensive, for example in terms of processing, memory, bandwidth, and time.

In the disclosed service intelligence systems, devices and applications in an information technology infrastructure can be monitored. For example, the devices can include servers, clients, routers, applications, or any other network connected device or application can be monitored. An agent can be executed on each monitored server and optionally in one or more monitored applications. Information, such as metadata, regarding the monitored devices and applications can be stored in a Configuration Management Database (CMDB). A CMDB is a database that can include a collection of Configuration Items (CIs) that describe various information technology assets and relationships between the CIs. The agent can collect metadata from the CMDB that is associated with the monitored server and/or applications executing on the monitored server. The collection can be performed in near-real-time such as by using a subscription technique whereby updated information is sent to the agent by the CMDB after metadata is added, removed, or changed in the CMDB. The collected metadata can include data that can be used as dimensional data in a data warehouse.

The agent also can collect metrics from the monitored server and/or applications executing on the monitored server. Metrics can include, for example, operating characteristics of the server, such as memory usage and cpu time and/or operating characteristics of one or more applications executing on the server such as a database application or an application node such as a java virtual machine. Such metrics can include a number of semaphores, number of sessions, number of inserts, number of rejected connections, etcetera. Metrics can include functions of or statistical attributes of collected information. For example, a z-score, standard deviation, variance, or other formula can be used on collected information to generate a metric. Such metrics can be generated on the client side or after metric data is received by the message bus described below, for example. Metrics can also include a count of a number of times that a particular metric (e.g., number of semaphores) exceeds a certain threshold such as a statistical attribute (e.g., standard deviation or z-score) of a metric. Metrics can be grouped into groups of like metrics, and certain metrics or groups of metrics can be associated with particular potential performance issues. The agent can periodically compile the metrics and metadata into a packet and send the packet to a message bus. In one implementation, only metrics and the metadata associated with the metrics is included. The packet can be retrieved from the message bus by an aggregation service and stored in a data warehouse. This process can harmonize the collection of metrics and metadata and reduce the need for joins against the configuration management database when analyzing the metrics.

FIG. 1 is a diagram of a service intelligence system 100, also called a data warehouse, can organize large volumes of data dimensionally, where each item is stored in the database at an address determined by indices of a multi-dimensional storage array where each dimension can be related to a category of items to be stored. An individual item can be accessed by specifying values for each of the dimensions under which the item is stored. This capability contrasts with relational databases where the data is organized in records, where each record stores the data associated the record. Accessing an individual data item requires accessing the record containing the item. In a relational database, as data sets and records become very large, accessing items stored in records can become difficult.

Service intelligence system 100 can organize data as a hyper-dimensional cube with each dimension corresponding to an item with the size of the dimension equal to the number of values that an item can assume. In this fashion a particular data item or data items corresponding to a particular subset of data items can be accessed by forming a partial address or addresses from the values of the items and thereby accessing the desired items. Service intelligence system 100 can permit faster access to data items in large databases for example when the data items are stored across multiple computing devices.

In addition to the data items themselves, a service intelligence system 100 can have elements that assist in storing, manipulating and accessing data. For example, various clients such as clients 102 and 104 can have database and application server software programs running on various computing devices that are included in service intelligence system 100.

A service intelligence system 100 can include many computing devices communicating via a number of local or wide area networks and running many different types of software programs that comprise the service intelligence system 100. It can be desirable to gather metrics regarding the operation of the various hardware and software elements that comprise the service intelligence system 100. In this way it can be determined whether clients including clients 102 and 104 are performing properly and if not, which element or elements are responsible for the underperformance.

One problem that can be faced in instrumenting a service intelligence system 100 to gather performance metrics is acquiring the metrics from disparate sources via a plurality of communications paths or pipelines. Acquiring metrics and metadata regarding the operation of a service intelligence system 100 in this fashion can result in out of date information or the inability to get point-in-time information about an event or transaction that occurred. In one example, dimensional data could be collected on an hourly basis via one pipeline and transactional data could be captured every five minutes via another pipeline. In this example, the dimensional data could be stale and may not be fully up-to-date. One technique for aggregating information regarding an event or transaction is to perform a system "join" on the data. A join operation can combine database elements that are associated but not necessarily stored together. Joins can be very expensive operations to perform in terms of processing time and computer resources required. For at least these reasons techniques for combining metrics and metadata associated with an event or transaction in the service intelligence system 100 so that they can be quickly and easily accessed can be desirable.

Aspects of disclosed implementations can maintain comprehensive and timely information regarding the performance of service intelligence system 100 by collecting information at the sources of the event or transaction, including database and application servers, that comprise service intelligence system 100 to transmit information regarding the performance of the database (metric data and metadata) on a periodic basis using a single pipeline, and then aggregating and storing the information together in a database. In this way the system can have quick and easy access to timely information regarding the operation of clients such as clients 102 and 104. The use of the term "client" is used here by way of example and for convenience only. Clients 102 and 104 can be embodied by any computing device including but not limited to servers, applications, services, storage, or any network-connected or enabled device or application. Additional clients (e.g., devices) may also be included in system 100.

The performance of service intelligence system 100, and in particular clients such as clients 102 and 104 can be determined using performance modeling. Performance modeling can include taking into account numerous factors, including factors that can change dynamically. Changes to such factors can be caused, for example by user interaction (e.g., load, changes in transactional semantics, etc.) or the environment (e.g., by automation or manual configuration of an information technology infrastructure). Performance modeling can use data transformations, machine learning, natural language processing and the like to determine models that can be used by a predictive modeling module along with collected metric data and metadata to, for example, predict performance issues. The application of performance modeling to the periodically collected metadata and metric information can enable proactive detection of performance issues; and in some cases before a user of a client device recognizes the performance issue or before a user submits an incident report about a performance issue, for example. Due to the dynamic nature of the information technology infrastructure including clients 102 and 104, models may become out-of-date and provide a less accurate prediction of performance issues over time. Thus, in one implementation of a service intelligence system, models, metric data, and metadata can be fed back into an analysis module in a feedback loop to enable the generation of new models reflecting the dynamic change of the information technology infrastructure and the service intelligence system.

A service intelligence system 100 can be implemented using one or more computing devices. Each computing device can include one or more processors and one or more memories that can communicate with each other and with other components of the computing device. The memories can include temporary storage such as DRAM and persistent memory such as disk drives, flash memory or optical disks. A computing device can also include components such as network interfaces, input devices such a keyboards or touch screens and output devices such as display screens. These components can communicate with the processors and memories via one or more busses. The network component can permit the computing device to communicate with other systems or computing devices nearby, by means of local area networks such as wireless networks or communicate with more distance systems or computing devices by means of wide area networks such as the Internet or cellular telephone networks.

The computing devices can include software programs loaded into memory and from there executed by a processor. The software programs can include an operating system that serves as a background administrator for tasks executing on the computing device and applications programs. The applications programs can include software programs according to disclosed implementations that can create, manage and analyze databases.

Service intelligence system 100 includes clients 102, 104 that provide event information about the operation of, for example, clients 102 and 104. Messages to and from clients 102, 104 can be handled by message bus 106, for example a broker that provides publish-subscribe messaging. Message bus 106 is a software program that can process a large number of messages from a large number of different sources and route them to the appropriate destination reliably and efficiently. Message bus 106 can include a number of brokers for handling messages received from clients such as clients 102, 104.

Messages processed by the message bus 106 can be passed to a streaming interface 112. Streaming interface 112 can accept or send messages to and from message bus 106 while maintaining streaming data input and output to and from other software programs or computing devices in the service intelligence system. Streaming interface 112 can also communicate with clients 102, 104, for example. Streaming interface 112 can, for example, be implemented using software that is designed for large-scale data processing.

Raw data from the streaming interface 112 can be passed to a distributed file system 108, for example a Distributed File System (DFS). Distributed file system 108 can be implemented using a software program for storage and large-scale processing of data on clusters of computing devices. The distributed file system 108 can be implemented on one or more database servers formed on a cluster of one or more computing devices that can communicate via one or more local- or wide-area networks. The distributed file system 108 can receive raw data from the streaming interface 112 related to metric data and metadata received by the message bus 106 and streaming interface 112. The distributed file system 108 can, for example, serve as a data repository for all metric data and metadata received from clients 102 and 104. The data in distributed file system 108 can be compacted as it ages, for example, the granularity of the data may be reduced for older data by aggregating older data points.

The distributed file system 108 is suited for storage of large data sets by storing data sets in sparse, distributed, persistent multi-dimensional data space. In contrast to relational databases, where data are stored in records and addressed by an index to the record, the distributed file system 108 can store data in a multi-dimensional space where data items can be accessed directly by an equivalent to row and column addressing. This permits the distributed file system 108 to perform efficient and reliable addressing of data in very large complex data sets.

Messages from the message bus 106 can also be sent to a distributed database 110, for example by way of an aggregation service 111. The distributed database 110 can be a database that can store a sampled set or aggregated set of data from the collected metric data and metadata. The sampled or aggregated set of data can be produced by the aggregation service 111 by processing the collected metric data and metadata. The distributed database can alternatively be a relational or dimensional database. Metadata can include information regarding the state of the service intelligence system 100 clients, including applications, servers and software at the time a transaction is executed by a client, for example. Metrics can include performance measures of the service intelligence system 100 clients, including applications executing on the clients, for example.

Streaming interface 112 can also communicate with a Configuration Management Database (CMDB) 114 and distributed database 110. CMDB 114 can also communicate directly with the distributed file system 108, distributed database 110, the message bus 106 or clients 102, 104 directly, for example, in certain implementations. The CMDB 114 can serve as a central repository, storing information regarding the configuration and operation of aspects of the service intelligence system. For example, the CMDB 114 can include various Configuration Items (CIs) that each represents an entity in an information technology infrastructure. For example, each of clients 102 and 104 may have an associated Configuration Item. Applications or services within clients 102 and 104 may also have associated Configuration Items. Other clients, servers, or entities within the information technology infrastructure may be connected to or included in service intelligence system 100 and some or each may have associated CIs stored in the CMDB 114. Relationships between CIs may also be stored. For example, a CI for an application may depend on another application or server.

The clients 102, 104 of service intelligence system 100 can be programmed to receive data regarding their performance metrics to the CMDB on a "when changed" basis, for example. The clients 102, 104 can be programed to "listen" for metric data representing changes in the service intelligence system 100 transmitted by the CMDB 114.

Metadata can be data regarding the configuration of clients or applications executing on the clients in the service intelligence system. For example, if more storage space were added to the client 102, the client 102 can send a message to the CMDB 114 via message bus 106 and streaming interface 112 regarding the change in storage capacity. The CMDB 114 can timestamp the data, for example, and store it in the CMDB 114 to be indexed by time and data type. Alternatively, changes in the configuration of entities in an information technology infrastructure and/or service intelligence system 100 can be collected using a periodic discovery process, including agent and agentless methods. Information stored in the CMDB 114 regarding a particular client such as client 102 may be collected independently from the operation of client 102. Aspects of disclosed implementations can collect metric data from the CMDB and store it in the distributed database 110, for example.

Metadata and metric data stored in the distributed database 110 can be analyzed by analysis module 116 to determine models for the operation of devices within the service intelligence system 100. In addition to analysis module 116, service intelligence system 100 can include relations component 122 that can analyze relationships between metadata items from the distributed database 110 or distributed filesystem 108. These relationships can be forwarded to an approve/reject module 126 that can analyze the relationship between database elements determined by relations component 122 and thereby approve or reject possible changes to the service intelligence system 100, for example.

Analysis module 116 can also transmit the analysis results to a modeling module 120 that can determine behavioral models that describe the dynamic relationships between elements of the service intelligence system 100 in operation. For example, analysis module 116 can utilize various machine learning techniques to produce models for determining when or predicting that the operation of entities within an information technology infrastructure, such as clients 102 or 104 will or have fallen outside of desired operating parameters. Analysis module 116 can create one or many models that can be applied singularly or simultaneously against information available, for example in distributed database 110. The modeling module 120 can pass the determined behavioral model(s) to a predictive modeling module 118 for further processing, and may be configured to transform the model into a standard format, such as Predictive Modeling Markup Language (PMML). The analysis module 116, predictive modeling module 118, and/or modeling module 120 can express and interpret the behavioral model using a standardized markup language, such as PMML. The predictive modeling module 118 can apply metrics received via the streaming interface 112 to the models generated by analysis module 116 to determine whether there are any events, alerts, and or issues with the information technology infrastructure such as with respect to clients 102 and 104.

The output from the predictive modeling module 118 can include information regarding a current or prospective issue or problem with a client or other entity in an information technology infrastructure. This information can be used, for example, to generate a dashboard or reports, such as but not limited to the example shown in FIG. 5. This information can also be used to automatically generate incident records or reports, for example, in an Incident database of an ITSM system. This information can also be used to orchestrate self-healing actions on one or more clients. Such orchestration could be initiated automatically, for example or can be queued for approval by an operator. An example of self-healing orchestrations can include, for example, restarting a java virtual machine on a client if a number of transactions waiting for semaphores is increasing but a number of transactions processed does not increased or alternatively if there are out of memory errors. Another example can include increasing a number of application nodes assigned to a client if a number of rejected requests increases.

The analysis module 116 can also pass results to a self-healing module 124 to determine self-healing actions. Self-healing module 124 can recognize particular events and/or configurations and relations between elements of the service intelligence system 100 and take corrective action without requiring intervention of operators, for example. For example, self-healing module 124 can cause the orchestration of a change to a client such as client 102, such as the reconfiguration of an application, such as a database module or a virtual machine module.

The predictive modeling module 118 can provide feedback to the analysis module 116 regarding the use of existing models by predictive modeling module 118. For example, the existing models can be instrumented and information collected using the instrumentation can be used by analysis module 116 as an input when formulating new models. In this way, a feedback loop can be created to iteratively improve the accuracy of the generated models.

The operation of analysis module 116, relations module 122, model module 120, approve/reject module 126, and self-healing module 124 can be performed offline on a periodic basis. For example, new models can be generated on demand or on a predetermined schedule. The operation of modules 116, 120, 122, 124, and 126 need not be in real-time or as new metadata, metric data, or instrumented data from module 118 is received. Further information regarding an implementation of generation of models such as performed by modules 116, 120, 122, 124, and 126 is provided below in relation to FIG. 6.

Figure 2:
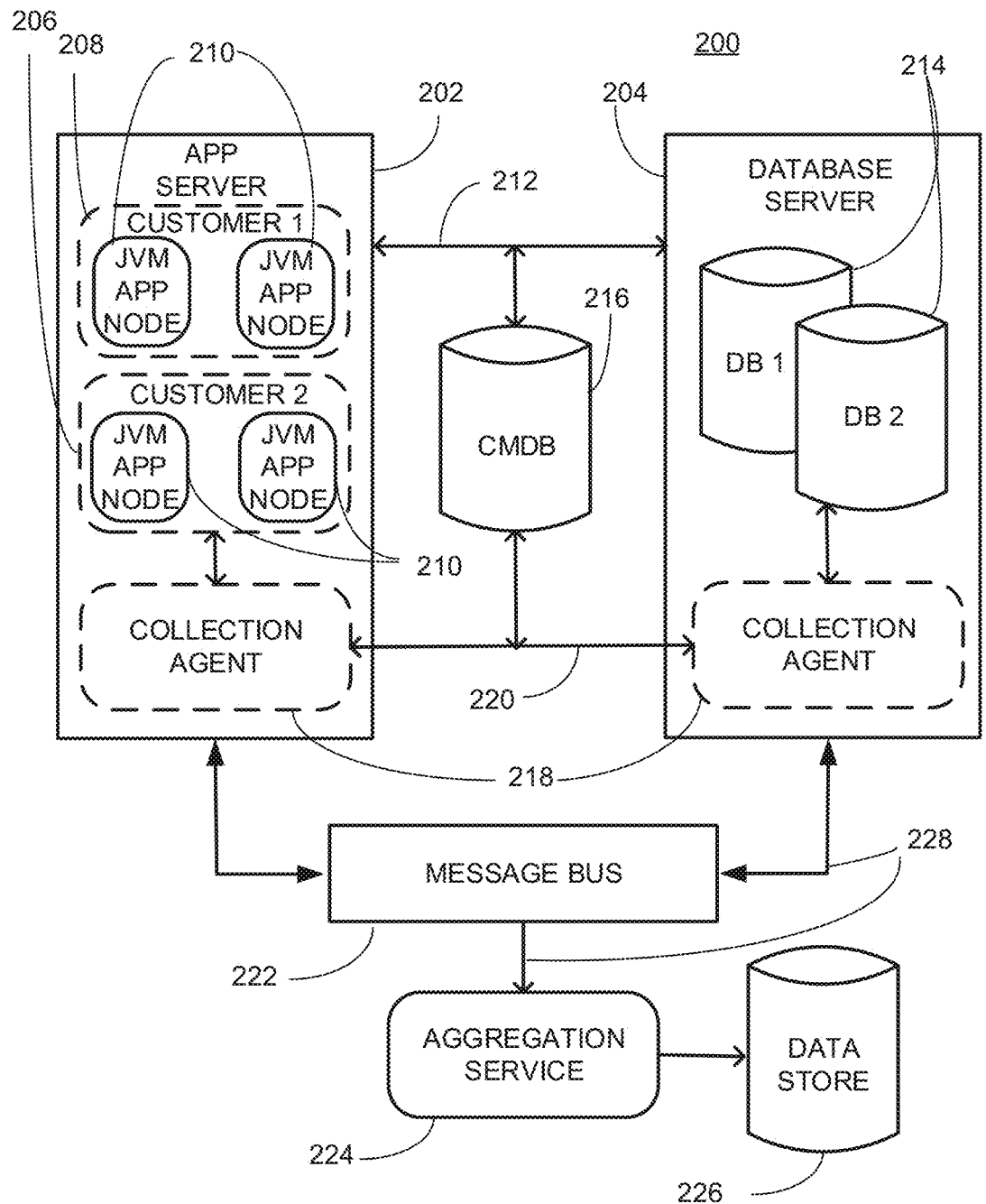
FIG. 2 is a diagram of a service intelligence system according to a disclosed implementation.

FIG. 2 is a diagram of a service intelligence system 200 according to a disclosed implementation. Service intelligence system 200 is similar in elements and operation to service intelligence system 100, with some data paths and elements drawn to emphasis relationships to disclosed implementations. The disclosed configurations of service intelligence systems 100 and 200 are exemplary only and alternatively implementations are contemplated including implementations that combine elements of systems 100 and 200. For example, service intelligence system 200 can be implemented within service intelligence system 100.

Service intelligence system 200 can include one or more applications servers 202. Applications server 202 can include one or more software programs executing on one or more computing devices having one or more processors and one or more memories. Applications server 202 can include software programs including java virtual machine (JVM) application nodes 210 grouped by customer 206, 208. For example, application nodes 210 can provide a cloud platform and applications to customers 206 and 208. The structure of application server 202 is that of a single-tenant system where each customer 206, 208 has dedicated application nodes 210 not shared with other customers. However, service intelligence system 200 also can operate within other cloud computing architectures including in multi-tenant systems.

Service intelligence system 200 can also include one or more database servers 204. Database server 204 can include one or more software programs executing on one or more computing devices having one or more processors and one or more memories. Database server 204 can include software programs including databases 214. The databases 214 can be relational databases such as Structured Query Language (SQL) database. For example, in a single-tenant cloud architecture, DB 1 may be assigned to customer 1 208 and DB 2 may be assigned to customer 2 206. In other architectures, such as a multi-tenant architecture, DB 1 and DB 2 214 or application nodes 210 may be shared amongst customers. The term "customer" is used herein for convenience only, and can refer to the use of a part of a computing infrastructure for any particular purpose. For example, the term "customer" may refer to one instance of a cloud platform or application attributable to a particular entity or person, even though that entity or person may have access to one or more additional instances of the cloud platform or application. The term "customer" may also refer to the usage of an instance by a particular entity or person.

In FIG. 2, JVM application nodes 210, organized by customers 206, 208 can communicate with database server 204 and configuration management database (CMDB) 216 directly via communications path 212 or via message bus 222. As discussed above in relation to FIG. 1, the CMDB 216 can include Configuration Items (CIs) regarding the configuration and operation of applications server 202, database server 204, customers 206, 208, application nodes 210, and databases 214.

Also executing on applications server 202 and database server 204 can be collection agents 218. Collection agents 218 can collect performance metrics as well as receive data regarding changes in metadata from applications servers 202 and database server 204. Collection agents can also gather data from CMDB 216 via communications path 220 or via a message bus 222. At predetermined periodic intervals collection agents 218 can transmit packets that include JVM performance metrics and metadata from applications servers 202 and database server 204. Alternatively, packets can be transmitted as information is received. For example, the metrics can include information collected from individual application nodes 210, individual databases 214, application server 202, database server 204, or a combination thereof. The packets can be transmitted via a pipeline composed of hardware and software elements of the service intelligence system 200, for example.

Collection agents 218 can subscribe to changes in metadata from the CMDB 216. For example, business rules can be set up on the metadata in CMDB 216 so that upon changing, the latest values of the metadata are pushed to the collection agents 218 by the CMDB. The collection agents can acquire the metadata by instancing a listener program that subscribes to the pushed changes in the metadata.

The collection agents 218 can transmit collected metric data and metadata in packets via a pipeline or communications channel implemented on service intelligence system 200 using, for example, message bus 222 among other elements. As discussed above in relation to FIG. 1, message bus 222 can be a software program that can receive, sort and re-transmit a large number of messages from a large number of sources efficiently. Transmitting packets of combined metric data and metadata using a single pipeline can improve the efficiency of collecting, transmitting, storing and in particular accessing metadata and metric data associated with transactions occurring in the service intelligence system.

Collections agents 218 can transmit data packets via pipelines implemented using message bus 222 to aggregation service 224. An aggregation service 224 can receive messages from collection agents 218 and aggregate them by selected groupings including, for example, source, such as which customers 206, 208 originated or received the event or transaction referenced by a transmitted message, by location, such as which applications server 202 or database server 204 originated the message, and by time, wherein messages relating to events that happen in a predetermined time period can be aggregated, for example. For example, a sliding window can be used (e.g., where a pre-determined time window is used ending at the current time). Once the aggregation service 224 has aggregated received messages they can be stored together in a data store 226, which can be a distributed database. Data store 226 can, for example, be distributed database 110 in service intelligence system 100. The data stored in data store 226 can be used as described with respect to FIG. 1 above. For example, one or more of the models determined by modeling module 120 can be applied to the collected data.

Applications server 202 and database server 204 may include more or less components in alternative implementations. For example, an applications server may include many additional customers and associated application nodes, such as 24 or 48 depending on customers usage and application server capacity. For example, a database server 204 may include many additional databases, such as 12 or 24 depending on customers usage and database server capacity. Other types of servers can be used within service intelligence system 200 other than the depicted application server 202 and database server 204. For example, a combined server may be used that includes both application nodes and databases. As another example, other types of servers can be included that operate different types of applications or databases, including but not limited to mail servers, file servers, printer servers, routers, firewalls, laptops, desktops, etcetera. In one implementation any entity having an associated CI in the CMDB 216, for example, may be included in addition to or instead of application server 202 or database server 204. Any reference to applications server 202, database server 204, or their respective components may also refer to these additional devices, components, or services.

Figure 3:
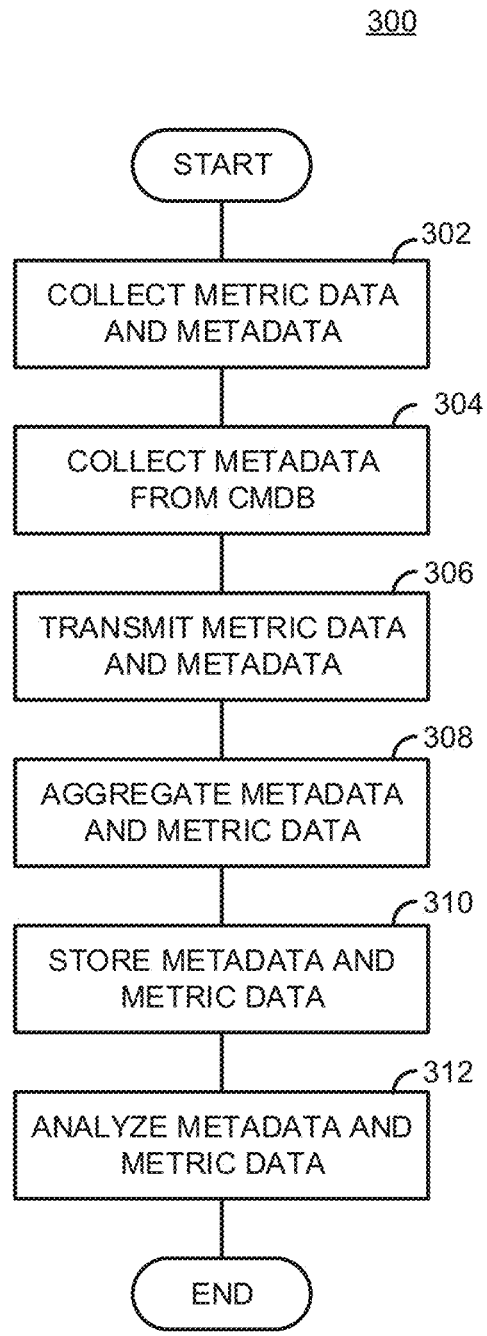
FIG. 3 is a flowchart diagram of a process for collecting data using a service intelligence system according to a disclosed implementation.

FIG. 3 is a flowchart diagram of a process 300 including the collection of transactional and dimensional data using a collection pipeline during operation of service intelligence system 200. Process 300 can be implemented as one or more software programs in a system including a computing device, for example. The software program(s) can include machine-readable instructions that are stored in a memory such that, when executed by a processor, cause the computing device(s) to perform process 300. Process 300 can also be implemented using hardware in whole or in part. As explained above, some computing devices may have multiple memories and multiple processors, and the steps of process 300 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter. Process 300 operates on transactions being performed in service intelligence system 200. Process 300 generates metric data and metadata pertaining to these transactions. Service intelligence system 200 can also generate metric data related to performance of or changes in the state of servers such as servers 202 and 204 in the service intelligence system 200. As mentioned briefly above, aggregating data metric data and metadata based on locality and time period permits information regarding the performance of a service intelligence system 200 to be efficiently determined and reported.

A service intelligence system 200 can have a variety of disparate data sources including applications server 202 and database server 204, data stores including data store 226, and communications paths, called pipelines, for collecting summaries or abstracts of transactional and dimensional data (metrics and metadata) from disparate data sources. A data source can be defined as a hardware or software module or system component that generates data regarding a transactions. A pipeline can be defined as a communications link that connects a data source with a data sink. For example, a pipeline can communicate messages from a database server 204 to aggregation service via communications links 228 and message bus 222. The communications links can include one or more networks and one or more computing devices.

A potential problem with multiple disparate sources, sinks and pipelines for collecting information regarding abstracted from transactional and dimensional data can be that, in the case of an event occurring, collecting all of the information used when consuming the event data, for example, can be difficult and time consuming and prone to out-of-date information. For example, disparate sources and pipelines can acquire information at different times and can store the information in different locations and in different formats. As discussed above, information can be gathered together by performing a join for example, whereby different subsets of the database are combined. This can be a expensive operation in time and system resources required.

Aspects of disclosed implementations can collect performance metrics as well as information regarding abstractions of transactional and dimensional data, also called metadata. At predetermined, configurable intervals data message packets can be sent from application server 202 and database server 204 including database and application node metrics along with associated metadata. This permits service intelligence system 200 to acquire "point-in-time" dimensional data that can be stored together with the information regarding the performance metric data. This permits improvements in accuracy in reporting along with avoiding the need to build separate pipelines for collecting the various types of metadata and metric data as well as coordinating multiple pipelines and data stores.

At step 302 metric data and metadata can be collected. Metric data can be collected from applications server 202 or database server 204 based on the operation of server 202, 204 or in the course of performing transactions, for example. In an implementation, metric data can be collected by accessing an XML file that is generated by a server or applications on a server relating to information about the operation or execution of the server or applications on the server. In an implementation, metric data can be collected by accessing log files or programmatically accessing functionality in the server or applications executing on the server that provides metrics about the operation of the server or applications executing on the server.

An example of a transaction that can be performed can be the entry of an incident indicating an issue experienced by a user of an information technology system in an ITSM (Information Technology Service Management) application. A customer can interact with one or more JVM application nodes 210 in a customer group 206, 208 executing on an applications server 202 to enter an incident including attributes relating to the incident such as the requestor, priority, and description of the issue. The customer interaction can generate a transaction that can cause information to be transmitted from applications server 202 to database server 204 via message bus 222 or directly via communications path 212 to store, modify or retrieve information in databases 214. Transactional data associated with this transaction can include the aforementioned attributes along with other attributes, such as user ID, for example.

In addition to the transaction data, metadata regarding the transaction can also be generated by, for example, the JVM applications nodes 210. For example, the transaction could originate from a particular customer computer, the identifier for which can be included in metadata associated with a transaction. Other metadata that can be generated at the time of a transaction includes dimensional attributes relevant to metric data collections such as software version, instance type (dedicated/shared), scheduler state (any, specified), node status (primary/secondary) and deployment model (generation 2, 3 or 4), for example.

Aspects of disclosed implementations can generate metadata regarding a transaction by interrogating the dimensional attributes at a time close to the time of the transaction. Some dimensional attributes, such as scheduler state and node status, can change from minute to minute as the CMDB 216 is updated to compensate for system components that are reconfigured or are taken out of or placed into service. System components that can be taken out of or placed into service can include software programs such as JVM application nodes 210 or hardware such as processors or memories. Since determination of root causes for performance changes can be dependent upon the system configuration at the time a transaction is performed, aspects of disclosed implementations generate metadata regarding a transaction at times close to the time the transaction was performed.

At step 304 metadata and system configuration information from the CMDB 216, for example, can be collected by collection agents 218. Collection agents 218 can execute locally on application server 202 and database server 204. Collection agents 218 can subscribe to changes in metadata from the CMDB 216. This can be accomplished by setting up business rules on selected metadata attributes so that changes in the selected metadata attributes are pushed automatically when the CMDB detects changes in the selected metadata attributes. For example, the set of metadata attributes that are selected can be configurable to permit modification to the set of metadata attributes that are collected and included in packets sent to data store 226. For example, it may be desired to limit collection so that not every metadata attribute associated with a CI or a related CI is collected, to limit bandwidth, memory, storage, and processing resource consumption. The collection of data from CMDB 216 need not occur during step 304 or after the generated metadata step 302. For example, in an implementation where CMDB changes are pushed automatically to collection agents 218, the collection of CMDB data can be performed in the background or in a separate process distinct from the operation of Process 300. Alternatively, portions of the collection of CMDB data can be performed in the background and portions performed in Process 300.

At step 306, the collection agents 218 can transmit packets of data including server and JVM/database metrics along with associated metadata, for example at predetermined intervals. Aspects of disclosed implementations can collect metadata at the same time as service intelligence system 200 collects transactional data. In this fashion, more of the information required for diagnosing and correcting performance issues with servers, application nodes, and databases are available in one place, reducing the need to collect metadata from a variety of disparate sources in order to track down possible causes for performance issues. The transmitted packets can be generated by collection agents 218 in a format similar to that described below in FIG. 4, for example. The transmitted packets can be generated programmatically using a known packet format. For example, the packets can be generated using a schema, such as an XML schema.

In addition to gathering the metadata into a single group of packets, collection agents 218 can transmit the packets using a single pipeline. As discussed earlier, a pipeline is a name for a communications path dedicated to a particular type of communications. If metadata were collected and transmitted aggregation service 224 using multiple pipelines, aggregation service 224 could have difficulty aggregating all of the metadata associated with a particular time or transaction into a single location, since packets can arrive asynchronously, for example out of order. Multiple pipelines can also present difficulty in system management, whereby maintaining multiple pipelines can be more difficult than maintaining a single pipeline.

At step 308, packets of metadata sent by collection agents 218 via message bus 222 can be received by aggregation service 224. Aggregation service 224 aggregates or collects packets of metadata sent by multiple collection agents 218 into a single location. Aggregation can be determined by time stamp, wherein only packets having a timestamp within a predetermined time window are aggregated, for example. Aggregation can also be determined by client, server or database. In this fashion, all relevant metadata associated with a particular transaction or time period can be aggregated into a single location, permitting fast an accurate analysis of the state of any part of the service intelligence system 200 at any given moment.

At step 310 the aggregated metadata and metric data can be stored in data store 226. Data store 226 can be a distributed database, for example. Storing aggregated metadata metric data in data store 226 can permit the metadata and metric data to be accessed by relevant dimensions, such as a timestamp on the metadata and metric data that identifies when it was collected. The aggregated metadata and metric data can also be accessed by dimensions that identify which applications server 202 or database server 204 may have generated the metadata and metric data. In this way aggregated metadata and metric data can be indexed by time and location, thereby permitting accurate identification of the state of the service intelligence system 200 at any given time for any given database component.

At step 312, the aggregated metadata and metric data can be analyzed, for example by using analysis module 116 or predictive modeling module 118 as shown in service intelligence system 100. For example, machine learning feature analysis techniques can be utilized. One or more key process indicators (KPIs) can be determined, for example by comparing collected metric data against standard random variables. KPIs can be formed, for example, by comparing collected metric data against statistical measures, such as standard deviation or variance. The KPI can be formed by keeping a count of a number of times that a particular piece or group of metric data exceeds or falls below a particular statistical measure (e.g., such as a particular standard deviation or variance) in a pre-determined time period (e.g., one hour). Machine learning techniques such as a classification and regression tree and a decision tree can be utilized.

In an implementation, the analysis of metric data and metadata can be based on the customers associated with the metric data and metadata. For example, different KPI's can be determined for customers of a different size or usage pattern, based on the observed usages of each category of customer. For example, customers having a particular number or range of servers, application nodes, or databases might be grouped together. As another example, customers with certain customizations or quantity of customizations of an application node or database can be grouped together. Customer categories can be further subdivided into subcategories, each with their own KPI's determined based on the collected metric data and metadata.

In an implementation, the analysis such as the KPIs can be determined based on comparison between time frames where a customer complains and when a customer does not complain. For example, a customer may be provided the ability to submit an incident or problem report, such as via an online interface or by calling a support line. The metric data and metadata during the periods which the incident or problem is submitted can be compared against metric data and metadata from other periods using machine learning techniques in order to improve detection of perceived problems or issues, such as before an incident or problem is submitted by the customer. For example, this technique can be useful in cases where a perceived issue by the customer may not equate with a known or defined performance requirement. As another example of an implementation of the analysis, metric data and metadata can be analyzed on a per hour basis such that metric data and metadata is compared against metric data and metadata from like time periods. For example, metric data and metadata can be compared for weekdays or Tuesdays between 11 am and 12 pm to determine the baseline for that time period and to better detect exceptions during that time period. This technique can be helpful, for example, where usage of a particular server or application may vary with time.

The machine learning system and machine learning classifiers used by the machine learning system can be tailored to particular usages and customers, for example by way of the examples described above.

FIG. 4 is a diagram of a sample packet 400 formed by collection agents 218 and transmitted over a single pipeline to message bus 222, for example. Sample packet 400 includes a first group 402 that include a timestamp indicating when the information in the packet was assembled, a version number ("1"), and a series of entries under "metadata" that describe various aspects of the server at the time the packet was assembled, for example.

Sample packet 400 also includes a "metrics" group 404 that includes metrics regarding the computing device executing the server that supplies the information in the sample packet 400. Metrics group 404 can also include statistics regarding the amount of CPU idle time, the amount of time the CPU spends waiting for events and the amount of free memory.

Sample packet 400 also includes an "appinstances" group 406. This group includes data that describes the instances of the application nodes 210 executing on applications server 202, for example. Appinstances group 406 can include an "appnodes" group 408 that describes the application nodes 210 including metadata regarding the node that can include the nodeID, whether the node is a "primary" or "secondary" node, what type of node and what the scheduler state is for the node. Appinstances group 406 can also include "metrics" data 410 regarding the applications node 408 that describe performance of the node, for example.

The sample packet 400 can also include a "metadata" group 412 that can describe the transaction or event that occurred and prompted the collection and transmission of the sample packet 400. The metadata group 412 can include the version number of the database program, the instance ID assigned to the process, a customer identifier and the type of transaction or event, for example.

Certain information included in sample packet 400 can be information forwarded to or collected by a collection agent 218 from a CMDB 216, for example. For example, certain information in the various "metadata" systems can be collected, maintained, and included in sample packet 400 by the collection agent 218 so that the metadata is associated with the metrics when stored in the data store 220. This process can reduce or eliminate the need for expensive joins between data store 220 and CMDB 216 when the information in data store 220 is analyzed. Inclusion of the most current data from CMDB 216 with the sample packet 400 also preserves the current state of metadata for later analysis.

Aspects of disclosed implementations can collect metadata regarding transactions or other events occurring during the operation of service intelligence system 200 from various sources and combine them into a single packet to be transmitted using a single pipeline to other elements of the service intelligence system 200. In this way information regarding the state of service intelligence system 200 can be stored together in a single location, thereby permitting quick and easy access to the information. This permits operators of service intelligence system 200 to determine whether, for example, servers 202, 204, application nodes 210, or databases 214 are operating normally or if elements of service intelligence system 200 requires intervention, either through self-healing or operator intervention, to correct an anomaly. Having the information previously assembled and stored in a single location permits these types of determinations and possible interventions to occur more rapidly and accurately than if the information would have to be assembled after the fact.

Figure 5:
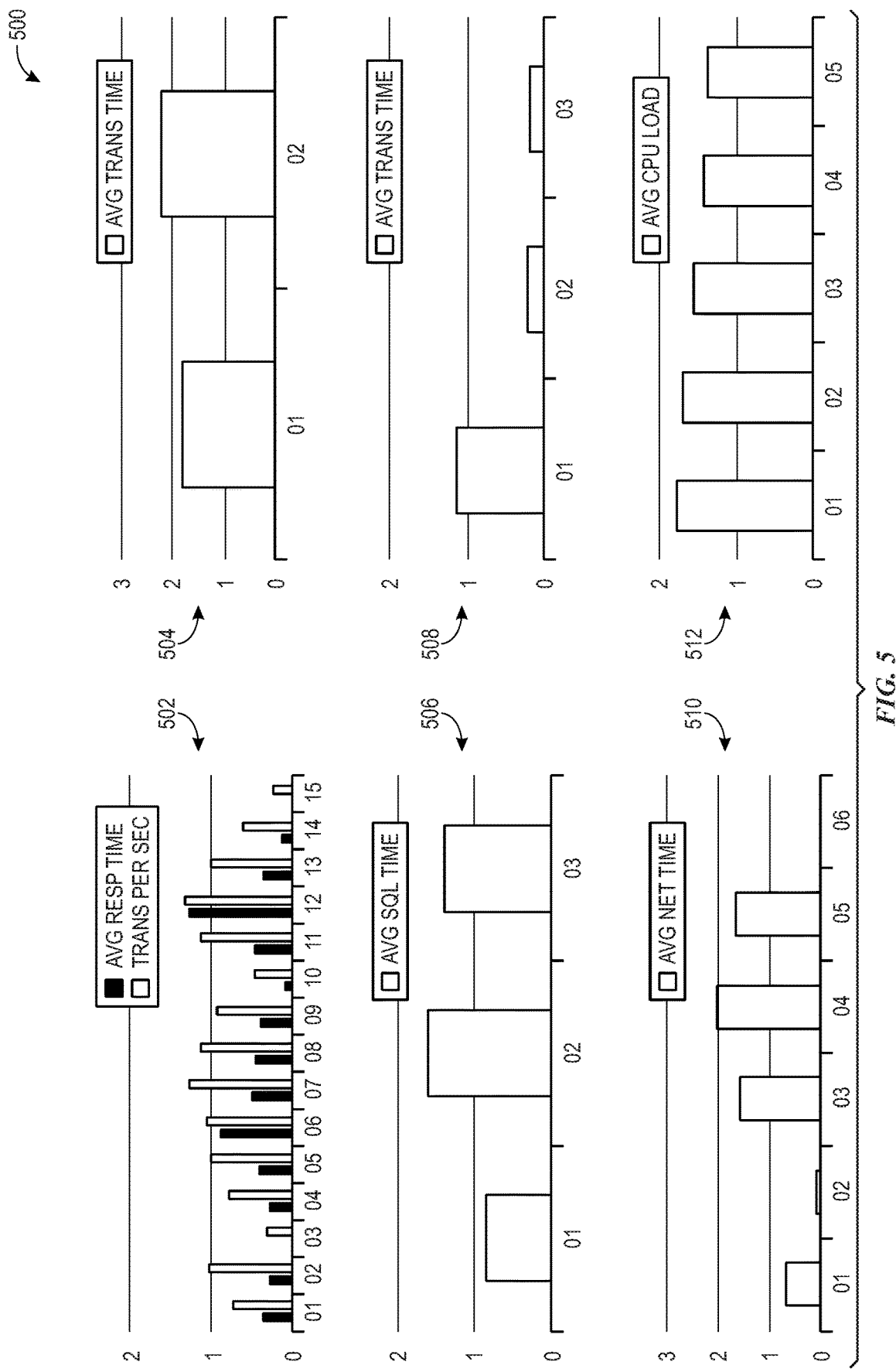
FIG. 5 is a diagram of sample reports formed using data messages collected according to a disclosed implementation.

FIG. 5 is a diagram of reports 500 that can be generated using service intelligence system 100, 200. Report 502 graphs average response time vs. transactions per second for various applications nodes. Report 504 graphs average transaction time vs. database generation version. Report 506 graphs average structured query language (SQL) transaction time vs. database identity. Report 508 graphs average transaction time vs. database identity. Report 510 graphs average net time vs. applications server and report 512 graphs average CPU load vs. database server.

These types of reports 500 permit an operator or administrator of a service intelligence system 100, 200 to determine if clients or servers, for example, are providing desired performance for users and if not, what aspects of the clients, servers, or other portions of an information technology infrastructure are affecting the performance. The reports 500 can also permit an operator of a service intelligence system 100, 200 to detect a problem that may not have affected a user's experience with the database but, if not addressed, could affect performance in the future, for example. Other reports can indicate more resources are needed in a particular area, for example.

Figure 6:
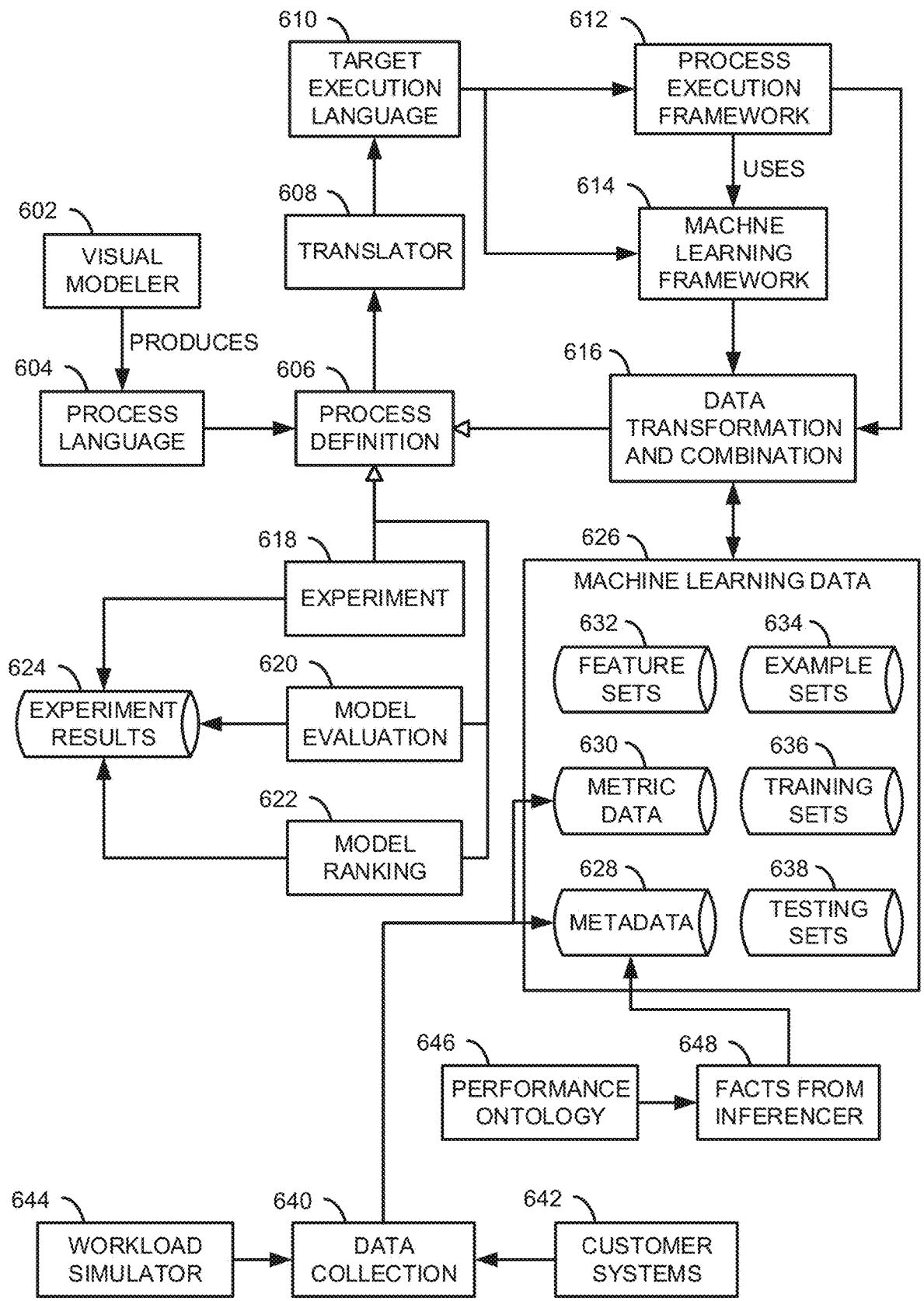
FIG. 6 is a diagram of components and processes for generating models for use in a service intelligence system.

FIG. 6 is a diagram of components and processes for generating models for use in a service intelligence system. Generation of models can include iteratively performing experiments to improve the performance models as applied to data collected from an information technology infrastructure and adapt to dynamic change in an information technology infrastructure. The generation of models can include all of the depicted components and process steps, a subset thereof, or additional components or process steps. The components and process steps shown may be utilized in the depicted configuration or in different configurations in an implementation.

Included is a visual modeler 602 that permits a user to identify initial key process indicators (KPIs) from metric data and metadata collected from devices in an information technology infrastructure. Visual modeler 602 can permit a user to identify key relationships between KPIs and other available data. The input received by visual modeler 602 is compiled into a machine readable format by process language 604. For example, process language 604 can be an XML format readable by process definition 606. The process language received via process language 604 and visual modeler 602 can include definitions of model generation scheduling, configuration of generation of models, and can also include an initial model.

Process language can represent a number of different processes. For example, process language can specify the transformation of primary or intermediate data sets into intermediate or final data sets for processing. Process language can also include definitions of classification experiments to be performed by a classifier including parameters for use with the classifier, identification or definition of training sets or testing sets to be used with the classifier, and how the results of the classifier can be stored for later use including for subsequent evaluation and model generation. Process language can include the steps used to performance rank a set of experiments. Process language can also include processes used to evaluate results to identify particular features of given models that may contribute more accuracy to a performance ranking produced by certain models. In one example, the process language can be used to identify particular metric data, metadata, and/or statistical indicators for use in generating models.

Process definition 606 controls the generation of models and collects the generated models during model generation. Many different models can be generated including using other aspects of the depicted system and process and more than one model can be selected for use in a service intelligence system.

The models included in process definition stage 606 can be passed to translator 608 to initiate generation of a new model. Translator 608 can translate the process language, models, and other data into a target execution language format 610 that can be consumed by process execution framework 612 and/or machine learning framework 614. Process execution framework 612 can interpret the translated process language to generate the new model. Process execution framework 612 can use machine learning framework 612 to apply machine learning methodologies including decision tree structures to generate the new model. The resulting new model and associated data can be passed to data transformation and combination 616 to be incorporated into the process definition 606 and into machine learning data 626 as a refinement of existing data and models and for further evaluation.

For example, experiment 618 can be used to define processes for testing the performance of generated models. Experiment 618 can include a series of rules for evaluation of generated models. Experiment 618 can work in tandem with and/or can control model evaluation 620 and model ranking 622. These modules can operate on test data such as testing sets described later. Model evaluation 620 for example, can apply the test data to the generated models to determine test output. In certain implementations, the test data can have associated known performance output to enable comparison between the generated models and known output that is satisfactory. Model ranking 622 for example, can rank the generated models to enable selection of a set of models for use in a service intelligence system, such as by using the known output.

Data collection 640 operates to collect data for generation of models. Data collection 640 can collect data from customer systems 642 and a workload simulator 644, for example. Workload simulator 644 can, for example, generate sets of metric data and/or metadata that can be associated with known performance characteristics (e.g., known-good model output) for use in generating models and testing models. For example, workload simulator 644 can generate large amounts of examples for use by machine learning framework 614 without requiring actual collection of data from customer systems that are associated with known performance issues. The data collected by data collection 640 can be passed to machine learning data 626 for use in generating models, including but not limited to metadata 628 and metric data 630. Machine learning data can be accessed by and updated by the process execution framework 612, machine learning framework 614, and/or data transformation and combination 616 for use in generating models, for example. The collected metric data and metadata can be assigned to feature and example sets 632, 634 for consumption by machine learning framework 614, for example. Training sets 636 and testing sets 638 can be used in particular to respectively train or generate models, and then later to test the generated models. For example, testing sets 638 can include known performance results that can be used as a comparator against the output of generated models. Metadata 628, Metric Data 630, Feature Sets 632, Example Sets 634, Training Sets 636, and Testing Sets 638 each represent an independent collection of data in an implementation, however each of these collections of data can be stored in the same or different storage mediums or databases. In an implementation, certain of these collections of data, in whole or part, may incorporate other collections of data by reference.

Developed information about performance issues can be incorporated into performance ontology 646. For example, information from a knowledge base regarding troubleshooting of known performance problems (e.g., information indicating that a particular performance issue is related to or is not related to particular metric data), and knowledge regarding machine learning models and performance of generated models for evaluating performance of an information technology infrastructure (such as collected in experiment results 624 or from data transformation and combination 616). Performance ontology 646 can be expressed or stored in the form of an ontology language, such as the Web Ontology Language (OWL).

Performance ontology 646 can be input into facts from inferencer 648 to generate inferenced facts for use in generating models. For example, the inferenced facts generated by facts from inferencer 648 can be stored in machine learning data 626, such as in metadata 628.

Figure 7:
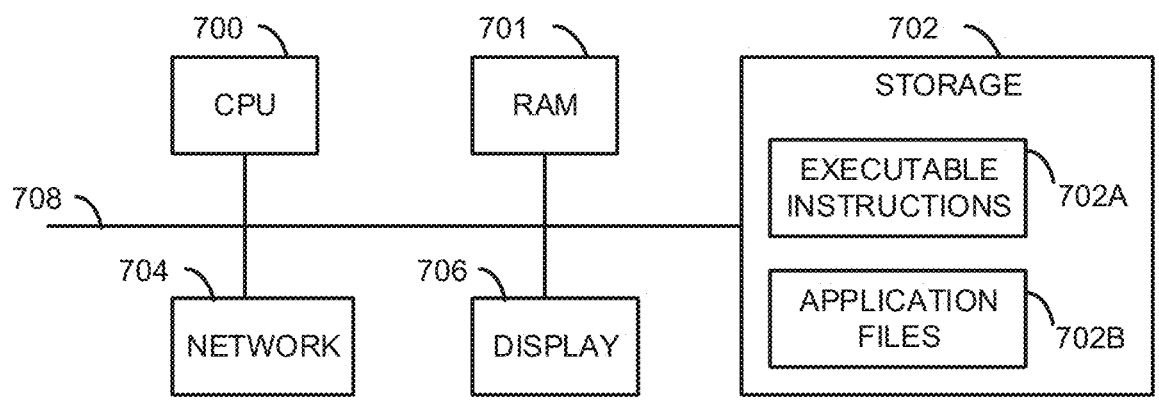
FIG. 7 is a block diagram of an example internal configuration of a client or server.

FIG. 7 is a block diagram of an example internal configuration of a client or server. As previously described, clients, servers, or other devices in an information technology infrastructure or service intelligence system may take the form of a computing system including multiple computing devices, or in the form of a single computing device, for example, a mobile phone, a tablet computer, a laptop computer, a notebook computer, a desktop computer, a server computer and the like.

The internal configuration can include CPU 700, RAM 701, storage 702, network 704, display 706, and bus 708. CPU 700 can be a conventional central processing unit. CPU 700 can include single or multiple processors each having single or multiple processing cores. Alternatively, CPU 700 can include another type of device, or multiple devices, capable of manipulating or processing information now-existing or hereafter developed.

The RAM 701 can be Random Access Memory or any other suitable type of storage device can be used as memory. RAM 701 can include executable instructions and data for immediate access by CPU 700. RAM 701 typically comprises one or more DRAM modules such as DDR SDRAM. Alternatively, RAM 701 can include another type of device, or multiple devices, capable of storing data for processing by CPU 700 now-existing or hereafter developed. CPU 700 can access and manipulate data in RAM 701 via bus 708.

Storage 702 can include executable instructions 702A and application files 702B along with other data. The executable instructions 702A can include, for example, an operating system and one or more application programs for loading in whole or part into RAM 701 and to be executed by CPU 700. The operating system can be, for example, a Windows, Mac OS X, and/or Linux operating system. The application program can include, for example, a web browser, web server, java virtual machine, and/or database server. Application files 702B can, for example, include user files, database catalogs, and configuration information. Storage 702 may comprise one or multiple devices and may utilize one or more types of storage, such as solid state or magnetic.

The internal configuration can also include one or more input/output devices, such as network 704 and display 706. The network 704 and display 706 can be coupled to the CPU 700 via the bus 708. The network 704 can, for example, provide a network interface to network 30 and may take the form of a wired network interface such as Ethernet or a wireless network interface. Other output devices that permit a user to program or otherwise use the client or server can be provided in addition to or as an alternative to the display 706. When the output device is or includes a display, the display can be implemented in various ways, including by a liquid crystal display (LCD) or a cathode-ray tube (CRT) or light emitting diode (LED) display, such as an OLED display.

Other implementations of the internal architecture of clients and servers are also possible. For example, servers may omit display 706. The operations of the CPU 700 can be distributed across multiple machines which can be coupled directly or across a local area or other network. The RAM 701 or storage 702 can be distributed across multiple machines such as network-based memory or memory in multiple machines performing the operations of clients or servers. Although depicted here as a single bus, the bus 708 can be composed of multiple buses.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably.

Further, in one aspect, for example, a computing device can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system comprising:
   one or more processors; and
   one or more memories including instructions executable by the one or more processors to implement:
   a configuration management database including a plurality of configuration items each having a plurality of attributes;
   a first data collection agent operating on a first monitored server to:
   collect metadata associated with the first monitored server from the configuration management database;
   collect metric data from the first monitored server regarding operation of the first monitored server, including at least one metric from at least one application executing on the first monitored server; and
   assemble the collected metric data and at least part of the collected metadata into a packet for transmission from the first monitored server to a message bus using a single pipeline wherein the packet and subsequent packets are sequentially transmitted and received via the single pipeline, wherein the single pipeline comprises a singular communications path such that the collected metric data, the at least part of the collected metadata, and other packets transmitted via the single pipeline are transmitted and received in sequential order;
   an aggregation service that aggregates data of the packet and at least one other packet from the message bus based on at least one of a plurality of features associated with both the packet and the at least one other packet; and
   a distributed database that stores the aggregated data based on the at least one of the plurality of features.

2. The system of claim 1, wherein the metadata is first metadata, the metric data is first metric data, and the packet is a first packet, wherein the one or more memories further includes instructions executable by the one or more processors to implement:
   a second data collection agent operating on a second monitored server to:
   collect second metadata associated with the second monitored server from the configuration management database;
   collect second metric data from the second monitored server regarding operation of the second monitored server, including at least one metric from at least one database application executing on the second monitored server; and
   assemble the collected second metric data and at least part of the collected second metadata into a second packet for transmission from the second monitored server to the message bus using the single pipeline, wherein the first packet and the second packet are transmitted to the message bus sequentially via the single pipeline.

3. The system of claim 2, wherein the at least one application executing on the first monitored server is a java virtual machine application node operating java software configured to use the at least one database application executing on the second monitored server.

4. The system of claim 2, wherein at least some of the collected first and second metadata is dimensional data and at least some of the collected first and second metric data is fact data, wherein the single pipeline is provided between each of the first and the second monitored servers and the distributed database.

5. The system of claim 1, wherein the instructions to collect metadata associated with the first monitored server from the configuration management database includes:

sending a subscription request from the first data collection agent to the configuration management database, wherein the subscription request includes an identification of the first monitored server;

periodically receiving, from the configuration management database, metadata associated with the first monitored server, wherein the configuration management database sends the metadata to the first data collection agent based on status updates associated with the first monitored server.

6. The system of claim 5, wherein the metadata includes attributes that are associated with a configuration item associated with the first monitored server and that are stored in the configuration management database, and further includes attributes associated with at least one other configuration item having a relationship with the configuration item.

7. The system of claim 6, wherein the at least one other configuration item is associated with an application server executing on the first monitored server and the relationship is a dependency between the application server and the first monitored server.

8. The system of claim 5, wherein the subscription request further includes an identification of at least one application server having an associated configuration item in the configuration management database.

9. The system of claim 1, wherein the collected metadata includes metadata associated with the at least one application executing on the first monitored server.

10. The system of claim 9, wherein the collected metadata includes at least one of a software version, instance type, scheduler state, node status, or deployment model.

11. The system of claim 1, wherein the collected metadata excludes metadata not associated with the first monitored server.

12. The system of claim 2, wherein the first and the second data collection agents collect the first and the second metadata data using a respective listener that subscribes to changes in metadata attributes associated with the respective first and second monitored servers from the configuration management database.

13. The system of claim 12, wherein the respective listener subscribes to changes by creating a business rule in the configuration management database for each of the metadata attributes, the business rule requesting a latest value of each of the metadata attributes when the changes are detected.

14. The system of claim 1, wherein the one or more memories further includes instructions executable by the one or more processors to implement:
a predictive model configured to compare a subset of the collected metric data against a statistical measure of the collected metric data to detect a performance issue associated with the first monitored server when a count of a number of times that the subset of the collected metric data exceeds the statistical measure is greater than a predetermined threshold.

15. The system of claim 1, wherein the plurality of features comprises at least one of a timestamp, a location, source information, or transaction information.

16. A method comprising:
collecting metadata associated with a first monitored server from a configuration management database, the configuration management database including a plurality of configuration items each having a plurality of attributes;

collecting metric data from the first monitored server regarding operation of the first monitored server, including at least one metric from at least one application executing on the first monitored server;

assembling the collected metric data and at least part of the collected metadata into a packet for transmission from the first monitored server to a message bus using a single pipeline, wherein the packet and subsequent packets are sequentially transmitted and received via the single pipeline, wherein the single pipeline comprises a singular communications path such that the collected metric data, the at least part of the collected metadata, and other packets transmitted via the single pipeline are transmitted and received in sequential order;

aggregating data of the packet and at least one other packet based on at least one of a plurality of features associated with both the packet and the at least one other packet;

storing the aggregated data based on the at least one of the plurality of features; and generating an indication of a system performance of the first monitored server by applying a machine learning model to the collected metadata and the collected metric data, the machine learning model including a comparison between a subset of the collected metric data and a statistical measure of the collected metric data.

17. The method of claim 16, further comprising:
re-generating the machine learning model on a periodic basis using as inputs a prior generated machine learning model, collected metric data and collected metadata, a performance ontology indicating known performance characteristics of the first monitored server, and metadata and metric data generated by a workload simulator.

18. A system comprising:
a management server configured to:
execute an aggregation service;
receive a packet and at least one other packet from a message bus via a single pipeline, wherein the packet and subsequent packets are sequentially transmitted and received via the single pipeline, wherein the single pipeline comprises a singular communications path such that the packet and the at least one other packet are received by the aggregation service in order of transmission to the message bus; and
aggregate data of the packet and the at least one other packet based on at least one of a plurality of features associated with both the packet and the at least one other packet, wherein the packet comprises metric data collected by a first data collection agent operating on a first monitored server regarding operation of the first monitored server including at least one metric from at least one application executing on the first monitored server, and the packet comprises at least part of metadata associated with the first monitored server that is collected by the first data collection agent, and wherein the first monitored server is a configuration item of a plurality of configuration items of a configuration management database, each of the plurality of configuration items having a plurality of attributes; and a distributed database configured to store the aggregated data in a memory based on the at least one of the plurality of features.

19. The system of claim 18, wherein the first data collection agent collects the metadata associated with the first monitored server from any of the configuration management database and the first monitored server.

20. The system of claim 19, wherein the first data collection agent collects the metadata associated with the first monitored server from the configuration management database by:
- sending a subscription request from the first data collection agent to the configuration management database, wherein the subscription request includes an identification of the first monitored server; and
- periodically receiving from the configuration management database metadata associated with the first monitored server, wherein the configuration management database sends metadata to the first data collection agent based on status updates associated with the first monitored server.

\* \* \* \* \*